United States Patent Office 3,655,738
Patented Apr. 11, 1972

3,655,738
PREPARATION OF DIPERPHTHALIC ACIDS
Donald R. Nielsen, Corpus Christi, Tex., assignor to
PPG Industries, Inc., Pittsburgh, Pa.
No Drawing. Continuation-in-part of application Ser. No. 655,994, July 26, 1967. This application Oct. 31, 1969, Ser. No. 873,058
Int. Cl. C07c 73/10
U.S. Cl. 260—502 R
8 Claims

ABSTRACT OF THE DISCLOSURE

Diperphthalic acids are prepared from hydrogen peroxide and the phthalic acid in an alkanesulfonic acid reaction medium by using finely subdivided phthalic acid with a particle dimension below 0.1 millimeter, more notably in the range of from 0.001 to 0.1 millimeter. A unique crystal form of diperisophthalic acid is obtained, for example, by reaction of isophthalic acid of less than 0.044 millimeter (less than 325 mesh).

RELATED APPLICATIONS

This application is a continuation-in-part of application Ser. No. 655,994, filed July 26, 1967 now abandoned.

BACKGROUND OF THE INVENTION

Aromatic organic peracids may be prepared, according to an article by Silbert, Siegel and Swern, Journal of Organic Chemistry, volume 27, pages 1336–1342, by reacting hydrogen peroxide and the acid precursor in a liquid reaction medium containing alkanesulfonic acid, notably methanesulfonic acid, as an essentially liquid component. U.S. Letters Pat. 3,143,562 also describes this type of process for preparing aromatic organic peracids. The only diperphthalic acid mentioned in this literature was diperterephthalic acid, yields of which are reported to be 20 percent on a crude product basis unless the dimethyl ester of terephthalic acid was used in lieu of the acid.

Use of dimethyl terephthalate to obtain high yields results in increased expense due to the additional steps of forming the ester and subsequently converting the ester to the peracid with loss of methanol during the conversion. This procedure also led to a reaction mixture which was difficult to filter and wash.

SUMMARY OF THE INVENTION

It now has been discovered that use of phthalic acids in the form of finely divided particles having a dimension below 0.1 millimeter, more particularly in the range of from about 0.001 to 0.1 millimeter, advantageously effects the preparation of diperphthalic acids from hydrogen peroxide in an alkanesulfonic acid medium. Thus, this invention involves preparation of diperphthalic acids, notably diperisophthalic acid, according to an improvement of the general method described in U.S. Letters Pat. 3,143,562 and in the Journal of Organic Chemistry article, which improvement entails supplying phthalic acid reagents as a particulate composition, the particles of which have a dimension below 0.1 millimeter. The precise shape of the particles can vary so long as they have one dimension less than 0.1 millimeter. Mainly, however, the particles are in the shape of prisms or are needlelike.

By virtue of employing isophthalic acid which has been subdivided to a dimension below about 0.1 millimeter, conversions of the acid to diperisophthalic acid above about 90 percent and even as high as about 95 percent are attained under conditions which but for the particle size of the phthalic acid give significantly lower conversions. Moreover, these high conversions are realized with otherwise reasonable hydrogen peroxide concentrations and like reaction conditions.

Additionally, when the particle size of the isophthalic acid is below 0.044 millimeter (minus 325 mesh), a unique crystal form of diperisophthalic acid is prepared. This crystal form of diperisophthalic acid is characterized by an X-ray diffraction pattern having major line intensities at 4.21, 3.20 and 2.39 A. interplanar spacings.

It normally has been observed in a tabular crystal habit, i.e., a crystal shape or form having two approximately equal dimensions with the third dimension about one-fifth to one-third of the other dimension. This habit (or form) is in contrast with the needlelike (acicular) habit which is normal or typical of the stable, common diperisophthalic acid crystal normally prepared.

In a typical performance of this invention, isophthalic acid is treated to reduce it to the desired dimension using mechanical expedients for subdividing solids. For example, the acid can be ground for a suitable period, 2 or more hours, by way of illustration, in a ball mill. Other grinding apparatus such as micronizers and micropulverizers also are effective.

To insure the acid charged to the reaction system is substantially within the desired size range, the ground products may be screened. It has been observed that the particulate composition of isophthalic acid which passes through a 200 mesh screen (U.S. seieve series) provides the superior results. Thus, a preferred mode entails screening the subdivided isophthalic acid through a 200 mesh screen and utilizing the particles which have passed through the screen. Oversized particles of acid, i.e., those which do not pass through the 200 mesh sieve, may be subjected to additional grinding to reduce them to suitable size.

The particulate isophthalic acid composition made up of particles substantially all of which (e.g., at least 80 percent by number) are small enough to pass through a 200 mesh sieve (are sized below 0.1 millimeter) provided in this fashion is dispersed in a liquid reaction medium of alkanesulfonic acid and concentrated hydrogen peroxide. Reaction temperatures and pressures typically are those consistent with the maintenance of a liquid reaction medium, to wit, about 0° C. to 80° C. (ideally about 70° C.), and atmospheric pressure. Other conditions, nevertheless, are operative. Product diperisophthalic acid separates and is recovered. Usually, reaction periods are on the order of 1 to 3 hours, with shorter and longer reaction times being less apt to attain conversions as high.

DESCRIPTION OF THE PREFERRED EMBODIMENT

The following examples illustrate the manner in which the present invention may be practiced.

EXAMPLE 1

A reaction medium was provided by dispersing 5.0 grams (0.03 mole) of isophthalic acid (of the hereinafter specified particle size) in 28.8 grams (0.3 mole) of methanesulfonic acid. While the resulting suspension was regulated to 70° C. by use of a constant temperature bath, 3.18 grams of hydrogen peroxide containing 88.4 weight percent hydrogen peroxide (0.082 mole $H_2O_2$) was added. Samples were periodically removed from the reaction mixture and analyzed for hydrogen peroxide and peroxy acid content.

Isophthalic acid compositions of the screen sizes specified in Table I were obtained by screening the ground acid in special nylon screens and collecting the appropriate portions.

The following Table I lists the conditions and results:

TABLE I

Percent Conversion of IPA [1] to DPI [2]

| Time, hours | Particle size of IPA USNBS mesh size | | | | |
|---|---|---|---|---|---|
| | −35+100 [3] | −100+200 [4] | −200+325 [5] | −325+400 [6] | −400 [7] |
| 0 | 4.8 | 4.5 | 6.0 | 7.5 | 5.3 |
| 0.5 | 44.1 | 59.7 | 69.2 | 81.5 | 84.8 |
| 1 | 58.5 | 74.1 | 85.4 | 88.7 | 90.7 |
| 2 | 74.1 | 82.0 | 90.0 | 93.0 | 91.3 |
| 3 | 73.1 | 82.0 | 90.4 | 90.0 | 89.3 |
| 4 | 72.0 | 80.1 | 86.5 | 88.5 | 84.0 |
| 5 | 72.5 | 77.5 | 85.0 | 86.0 | 80.6 |

[1] Isophthalic acid.
[2] Diperisophthalic acid.
[3] 0.149-0.59 millimeter size.
[4] 0.074-0.149 millimeter size.
[5] 0.044-0.074 millimeter size.
[6] 0.037-0.044 millimeter size.
[7] Less than 0.037 millimeter size.

EXAMPLE 2

In another series of tests, isophthalic acid was ground for varying lengths of time in a porcelain ball mill using different grinding medium. The resulting isophthalic acid was reacted with hydrogen peroxide in a methanesulfonic acid reaction medium at 70° C. containing 10 moles of methanesulfonic acid and 2.75 moles of $H_2O_2$ per mole of isophthalic acid to produce diperisophthalic acid. Table II summarizes the results:

TABLE II

| | Isophthalic acid particle size (millimeters) | Maximum conversion (percent) | Time to maximum conversion (hours) | Percent decomposition at maximum conversion |
|---|---|---|---|---|
| Run: | | | | |
| 1 | 0.001 | 95.0 | 3 | 4.5 |
| 2 | 0.035 | 95.6 | 3 | 6.5 |
| 3 | 0.04 | 93.5 | 2 | 1.7 |

The hydrogen peroxide concentration was 87.6 percent in Runs 1 and 3 while it was 88.3 percent in Run 2.

In contrast to the results shown in Table II, use of the unground isophthalic acid provided a maximum conversion of 82.1 percent in 4 hours. About 51 percent of this unground isophthalic acid failed to pass through a 200 mesh screen. Some 11 percent was larger than 70 mesh.

EXAMPLE 3

The reaction was performed in a one-liter kettle fitted with a thermowell, stirrer and feed port. A slurry of methanesulfonic acid (723 grams) and finely divided isophthalic acid (125 grams) screened to −325 mesh was added to the reactor, and warmed while being stirred to 68° C., at which point addition of 73.5 grams of aqueous concentrated hydrogen peroxide (90.6 weight percent $H_2O_2$) at the rate of 0.093 mole per minute was commenced.

During the addition, the temperature of the reaction medium was held at 70° C. and the stirring rate was 550 r.p.m. After 90 minutes, at which time the maximum conversion was reached, the reaction medium was cooled to 40° C. and centrifuged to separate the solid diperisophthalic acid product. This separated product (approximately 130 grams) was spray washed with 1100 milliliters of deionized water.

The diperisophthalic acid product of this Example 3 had a unique X-ray diffraction pattern. It was in a tabular form with an average particle size length of 0.01 millimeter and width of 0.007 millimeter. When a slurry of this diperisophthalic acid (10 grams in 250 milliliters of deionized water) was stirred for six hours at about 23° C., the filtrate was found to contain 0.228 weight percent diperisophthalic acid.

EXAMPLE 4

The equipment and general procedure of Example 3 was followed except that the isophthalic acid reagent was screened to minus 200 plus 325 mesh size, the hydrogen peroxide was added at the rate of 0.097 mole and the stirrer was run at 850 r.p.m. Maximum conversion was attained at 177 minutes. This diperisophthalic acid product had a needlelike (acicular) habit (0.083 millimeter long and 0.004 millimeter in width) and had a water solubility of 0.127 weight percent under the test conditions set out in Example 3.

Table III compares the X-ray diffraction powder patterns of the novel diperisophthalic acid crystal (Example 3) with the common crystal (Example 4). The patterns were obtained with a diffractometer using a CuKα radiation at λ1.542 with a nickel filter.

TABLE III

X-ray Diffraction Powder Pattern Data
[$d$=Interplanar spacing; $I/I_1$=Relative intensity]

| Example 3 | | Example 4 | |
|---|---|---|---|
| $d$, A. | $I/I_1$ | $d$, A. | $I/I_1$ |
| 9.17 | 10 | 8.47 | 40 |
| 5.50 | 30 | 5.59 | 70 |
| 4.21 | 60 | 5.33 | 50 |
| 3.75 | 20 | 4.64 | 50 |
| 3.54 | 20 | 4.45 | 20 |
| 3.26 | 10 | 4.23 | 100 |
| 3.20 | 60 | 3.71 | 40 |
| 3.15 | 30 | 3.63 | 30 |
| 2.44 | 10 | 3.46 | 30 |
| 2.39 | 100 | 3.40 | 50 |
| 2.30 | 30 | 3.32 | 20 |
| 1.97 | 20 | 3.24 | 30 |
| 1.93 | 20 | 3.19 | 30 |
| 1.87 | 20 | 3.06 | 70 |
| 1.84 | 10 | 2.82 | 20 |
| 1.80 | 20 | 2.78 | 20 |
| 1.61 | 10 | 2.73 | 20 |
| | | 2.68 | 20 |
| | | 2.60 | 20 |
| | | 2.48 | 10 |
| | | 2.40 | 40 |
| | | 2.27 | 20 |
| | | 2.21 | 10 |
| | | 2.16 | 10 |
| | | 2.05 | 20 |

As Table III shows, the diperisophthalic acid product of Example 3 has a crystal form pronouncedly different from the common crystal form exemplified by the Example 4 product. It, for example, exhibits major line intensities at 4.21, 3.20 and 2.39 interplanar spacings.

Further indicative that the product of Example 3 is a different unique crystal form is its higher water solubility and its normal tabular crystal habit.

This unique crystal form of diperisophthalic acid is a metastable form. If present in aqueous media along with the common crystal form of diperisophthalic acid, it normally converts quite rapidly to the stable form. By cooling the aqueous medium, this conversion can be retarded.

This novel crystal form of diperisophthalic acid is especially useful as a bleaching agent. Like the other crystal form of diperisophthalic acid, it is capable of liberating active oxygen for bleaching and various oxidizing reactions. Due to its greater solubility in water, the common media in which bleaching is performed, it is an especially effective bleaching agent. It can be used, for example, as a commercial or domestic dry bleaching agent for removing stains the removal of which requires generation of active oxygen. Thus, it can be added to the contents of a domestic washing machine as would other dry bleaching agents to effect bleaching of common stains and soils along with common detergents, typically synthetic detergents.

In general, to insure that the metastable crystal form be the crystal form which is exclusively produced by the method herein described (reaction of hydrogen peroxide with isophthalic acid in methanesulfonic acid), the isophthalic acid reagent should be sized to minus 325 mesh (e.g., of no greater size than 0.044 millimeter). When the acid reagent is of somewhat longer particle size but below 0.1 millimeter, for example, sized from minus 200 and plus 325 mesh, a mixture of crystal forms usually results.

As the foregoing examples demonstrate, the present invention is especially suited to diperisophthalic acid preparation from isophthalic acid. The method of this invention, however, is applicable to conversion of other phthalic acids besides isophthalic (phthalic, terephthalic, and the halogenated, notably fluorinated or chlorinated, phthalic, isophthalic, and terephthalic acids) to their corresponding diperphthalic acids.

Although methanesulfonic acid is the ideal alkanesulfonic acid, the invention may be practiced with other alkanesulfonic acids, notably ethanesulfonic acid and other lower alkanesulfonic acids.

In general, concentrated hydrogen peroxide is used in effecting the conversion to the diperphthalic acids. Thus, at the outset of the reaction, hydrogen peroxide concentrations in excess of 60 percent, more notably in excess of 80 percent (hydrogen peroxide concentrations based upon the water and hydrogen peroxide content of the reaction medium) are employed. This normally involves using aqueous hydrogen peroxide solutions containing upwards of 80 percent hydrogen peroxide. The peracid formation generates water while consuming hydrogen peroxide and hence has a diluting effect.

A considerable excess of hydrogen peroxide is recommended for best results. Upwards of the stoichiometric 2.0 moles of hydrogen peroxide as concentrated aqueous hydrogen peroxide (rarely above 10 moles and usually no more than 4 moles) per mole of phthalic acid are charged. Economics, but not operability, dictate the amount of excess hydrogen peroxide be minimized consistent with attaining high conversions at reasonable periods of time. This usually amounts to from about 2.2 to 3.0 moles of hydrogen peroxide per mole of the phthalic acid.

The alkanesulfonic acid serves as the major component (other than reagent) of the reaction medium. It is typically used in quantities of 5 to 50 moles or higher per mole of the phthalic acid.

While the present invention has been described with respect to certain details of specific embodiments, it is not intended that the invention be construed as limited to such details except insofar as they are set forth in the appended claims.

What is claimed is:

1. In the method of producing a diperphthalic acid from a phthalic acid and hydrogen peroxide in a liquid reaction medium of lower alkanesulfonic acid, the improvement which comprises employing as phthalic acid reagent particulate phthalic acid having a particle dimension smaller than 0.1 millimeter.

2. The method of claim 1 wherein the phthalic acid is charged to the reaction medium as a finely-divided reagent having a particle dimension below 0.1 millimeter and above about 0.001 millimeter.

3. The method of claim 1 wherein the phthalic acid is isophthalic acid, the product is diperisophthalic acid and the alkanesulfonic acid is methanesulfonic acid.

4. In the method of preparing diperisophthalic acid from hydrogen peroxide and isophthalic acid in a liquid reaction medium comprising methanesulfonic acid, the improvement which comprises providing the isophthalic acid reagent therefor by dispersing isophthalic acid particles having a dimension less than 0.1 millimeter in the reaction medium.

5. The method of claim 4 wheerin the particles are screened through a sieve no larger than 200 mesh and the particles smaller than 200 mesh are used to prepare the diperisophthalic acid.

6. The method of claim 1 wherein the phthalic acid is phthalic, terephthalic, isophthalic or a halogenated phthalic, isophthalic or terephthalic acid.

7. The method of claim 4 wherein the liquid reaction medium is at 0° C. to 80° C.

8. The method of claim 3 wherein the particulate isophthalic acid reagent has a particle dimension less than 0.044 millimeter.

References Cited
UNITED STATES PATENTS

| | | | |
|---|---|---|---|
| 2,813,896 | 11/1957 | Krimm | 260—502 R |
| 3,143,562 | 8/1964 | Silbert et al. | 260—502 R |

BERNARD HEFLIN, Primary Examiner

W. B. LONE, Assistant Examiner